United States Patent [19]

Pierce

[11] 4,136,397

[45] Jan. 23, 1979

[54] ASTRONOMICAL TIMEPIECE

[76] Inventor: Darrel J. Pierce, Rte. #1, Box 88, Princeton, Id. 83857

[21] Appl. No.: 839,007

[22] Filed: Oct. 3, 1977

[51] Int. Cl.[2] .................... G06F 15/20; G04B 19/26; G01C 1/00

[52] U.S. Cl. .................................. 364/569; 33/1 H; 33/1 DD; 33/269; 58/3; 356/152

[58] Field of Search ................ 364/569, 459; 33/1 H, 33/1 DD, 269, 300, 301, 303, 349, 354; 73/178 R; 356/141, 152; 58/3

[56] References Cited

U.S. PATENT DOCUMENTS

| | | | |
|---|---|---|---|
| 3,480,779 | 11/1969 | Hand | 250/203 R |
| 3,940,859 | 3/1976 | Troseth | 33/270 |
| 3,996,460 | 12/1976 | Smith | 250/203 R |

*Primary Examiner*—Steven L. Stephan
*Attorney, Agent, or Firm*—James F. Cottone

[57] ABSTRACT

A method and apparatus for determining local solar time for virtually any location on any planet having a radiating sun, wherein the method requires minimal a prior knowledge of the planet's major characteristics and the apparatus is organized so as to permit completely automatic determination of the key parameters from which the time calculation is derived. Advantageously, the time determination is accomplished using a formulation of the time equation which depends on two key solid angles initially obtainable any time the planet's sun is reasonably high above the horizon. Additionally, methods are outlined which permit the apparatus to provide basic navigational data, such as latitude and longitude locations (for other than extreme polar positions) of the timepiece.

25 Claims, 6 Drawing Figures

ASTRONOMICAL TIMEPIECE

BACKGROUND OF THE INVENTION

1. Field of the Invention

The present invention relates to the measurement of time in general, and more particularly to the automatic determination of local time using direct observations of the sun.

More specifically, this invention relates to methods and apparatus for automatically carrying out the determination of lapsed time measurements of the rotation of the surface of a planet in relation to its daily and annual position with its sun.

2. Description of the Prior Art

Devices for determining time by primary reference to sun sightings are, of course, as old as time keeping itself. From the days of the earliest sun dials to the present however, the use of devices and methods for time determination which employ sun observations of all types have required a fair degree of knowledge and agility on the part of the users. These requirements virtually assured that time keeping by sun observations would be largely limited to use by scientists, scholars, and others trained in the setting up, calibrating and interpreting of the means employed.

Simple prior art devices arranged such that a minimum amount of skill would be required for their use invariably suffer from deteriorated accuracy. Exemplary early prior art devices of highly simple configurations are provided in U.S. Pat. No. 1,630,891 to Cooke and in 1,570,349 to Hollingwood. Even given the primitive nature of the devices disclosed therein, it is required that the user manipulate various planes, to insert at least latitude, and perform other approximations prior to use. More recent devices, such as that taught in U.S. Pat. No. 3,940,859 to Troseth, also require a good deal of manual manipulation on the part of the user and, as with most other devices wherein the equation of time is reduced to graphical indicia, suffers from a time reading of only modest accuracy.

SUMMARY OF THE INVENTION

The present invention is primarily directed towards providing a method for the determination of local (alternately solar) time, and an effective apparatus for carrying out the method, wherein a completely automatic timepiece is implemented. Whereas conventional approaches to the determination of solar time require the knowledge of key input parameters, obtainable only during equinoctal periods, the present invention makes use of two solid angles derived wholly from easily obtainable observations and may be unambiguously determined for virtually any location at any time the sun is reasonably high above the horizon. Because of the unique formulation of the time equation implemented, the use of straightforward electronic means is made practical, and the resulting illustrative embodiment teaches the organization of a device which is sufficiently devoid of conceptual limitations as to be useful on any planet having only nominal earth-like characteristics.

Due to the ability of the method employed in the instant invention to be initiated automatically, and to be of broad applicability, the resulting timepiece is ideally suited for use on other planets in addition to earth, and hence may be considered an astronomical timepiece. It is therefore a primary object of this invention to provide improved methods and apparatus for the determination of solar time.

A further object of the present invention is to provide an apparatus for automatically obtaining and displaying highly accurate solar time for any particular location at any annual season.

A further object of the present invention is to provide methods and apparatus for automatically obtaining and displaying accurate solar time wherein no human operator intervention is required for establishing initial operating conditions or for resolving ambiguities in the time determination process.

A further object of the present invention is to provide methods and apparatus for the determination of solar time on planets other than earth where the geophysical characteristics of the planet are less well known, and where no a priori knowledge of the period of rotation of the planet is required.

A further yet object of the present invention is to provide methods for the determination of selected intermediate astronomical (or terrestrial) parameters required for automatic solar time calculation, such as magnetic deviation and true geographical north direction plus axis of rotation data.

A still further object of the present invention is to provide a method for the determination of latitude location, longitude location, geographic north axis direction, and magnetic north deviation from true north — all from automatic measurements of a minimal number of input data parameters.

BRIEF DESCRIPTION OF THE DRAWINGS

Additional objects and advantages of the invention will become apparent to those skilled in the art as the description proceeds with reference to the accompanying drawings wherein.

DESCRIPTION OF THE PREFERRED EMBODIMENT

Spatial Relationships

Figure 1:
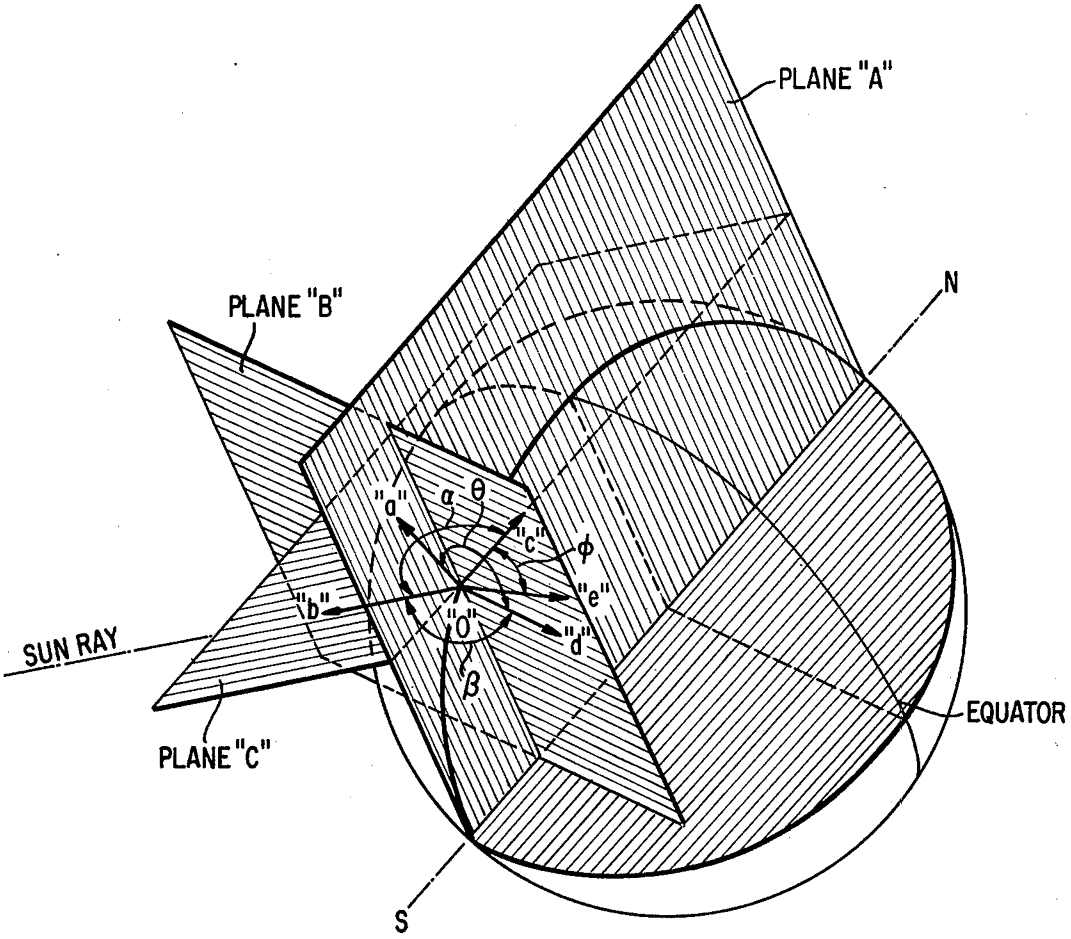
FIGS. 1-1A show perspective views of the spatial relationships of key parameters as referenced to a typical planet.

Referring now to FIG. 1, the spatial relationships between the various sensed and derived parameters are shown on a representative planet having north and south geographic poles N and S. For purposes of illustration, the planet will be assumed to have earth-like properties, that is — the pole locations define the planet's axis of rotation, the planet has a north magnetic pole somewhere near its north geographic pole, and so forth. However, as will be shown below, the present invention is also operable on planets having less well defined characteristics.

The use of the term "vector" throughout the present specification implies the attribute of direction with unit length. Unless otherwise noted, all vectors originate at the timepiece location (designated point "o") and are directed outward therefrom.

Let a point "o" designate the location of the timepiece 10 for which the apparent local time is to be determined. A first plane, plane A, is positioned such that it contains the three points N, S, and "o". A vector oe defines the local vertical at point "o" and is directed to the center of the planet. A vector oc is directed toward the north geographic pole, and is further aligned such that it is parallel to the planet's axis of rotation, N-S. Both vectors oe and oc lie within plane A. A second plane, plane B, is positioned at point "o" such that it is perpendicular to the vector oc. A vector ob is directed along the line of sight to the sun and, along with vector oc, defines a third plane, plane C. A vector od lying within plane B, is positioned to be perpendicular to plane A and hence defines the geographic east direction. A vector oa defines the intersection of planes B and C, and has the same sense as the vector ob. That is, vector oa is directed outward from the sunward side of plane A.

Note that at this point only three input data parameters were required to establish all other quantities, namely: local vertical; line of sight to the sun; and true geographic north parallel to the planet's axis of rotation. The manner of obtaining these key parameters will be described herein below.

Conventionally an angle $\theta$, defined as that angle between vectors oa and od, is the only angle which can be directly converted to local time in direct proportion to a planet's rotated position with respect to midnight through solution of the equation:

$$\frac{\text{Time}}{24\text{ hrs}} = \frac{(\theta^\circ + 90^\circ)}{360^\circ} \text{ when } -90^\circ < \theta \leq 270^\circ \quad \text{Eqn. 1}$$

$$\text{Time} = \frac{1}{15}(90^\circ + \theta^\circ) \text{ when } -90^\circ < \theta \leq 270^\circ \quad \text{Eqn. 1a}$$

Figure 1A:
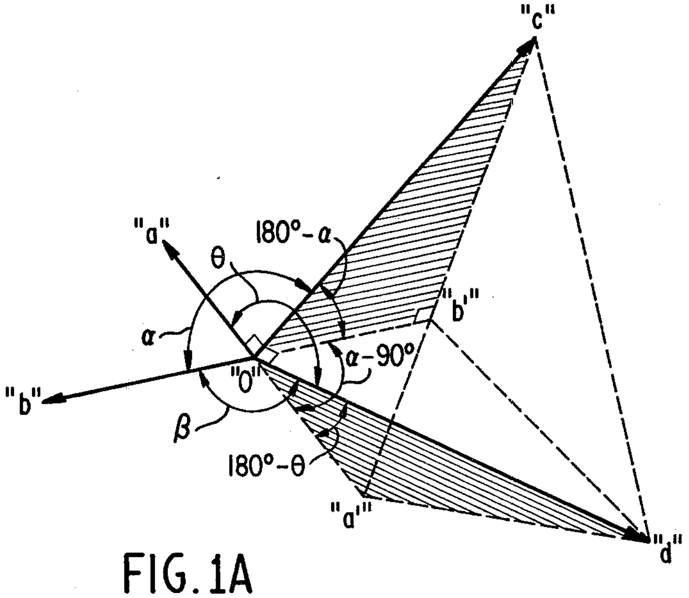

However, since the angle $\theta$ cannot be directly measured except during an equinoctal period, the invention obtains the angle $\theta$ indirectly from measurement of a pair of angles $\alpha$ and $\beta$. Angle $\alpha$ is defined as that angle between the vectors ob and oc, and angle $\beta$ is defined as that angle between vectors ob and od. Proof that:

$$\theta = \cos^{-1}\left(\frac{\cos\beta}{\sin\alpha}\right) \text{ when } 0^\circ \leq \theta \leq 180^\circ \quad \text{Eqn. 2}$$

may be found is Appendix I hereto, and can be followed with particular reference to FIG. 1A.

It therefore follows that timepiece 10 can convert the angles $\alpha$ and $\beta$ directly to a measurement of local time through the solution of the equation:

$$\text{Time} = \frac{1}{15}\left[90^\circ + \cos^{-1}\left(\frac{\cos\beta}{\sin\alpha}\right)\right] \text{ when } 0^\circ \leq \theta \leq 180^\circ \quad \text{Eqn. 3}$$

Additionally, the timepiece 10 will also provide the latitude location of point "o" by conversion of an angle $\phi$, defined as the angle between vectors oc and oe, by use of the equation:

$$\text{Latitude} = 180^\circ - \phi \quad \text{Eqn. 4}$$

Note that the inventor considers the north pole to be located at 0° latitude, equator at 90° latitude, and south pole at 180° latitude.

Additionally, the timepiece 10 will also provide the longitude location of point "o" through the solution of the equation:

$$\text{Longitude East of Meridian in degrees} = 15(T_o - T_m) \quad \text{when } T_o \geq T_m \left(\begin{matrix}24\text{ hr}\\ \text{clock}\end{matrix}\right) \quad \text{Eqn. 5}$$

$$= 15(T_o - T_m) + 360^\circ \text{ when } T_o < T_m \left(\begin{matrix}24\text{ hr}\\ \text{clock}\end{matrix}\right) \quad \text{Eqn. 5A}$$

Note that $T_o$ = local time at point "o" and that $T_m$ = time at an established meridian.

Hardware Operation

Figure 2:
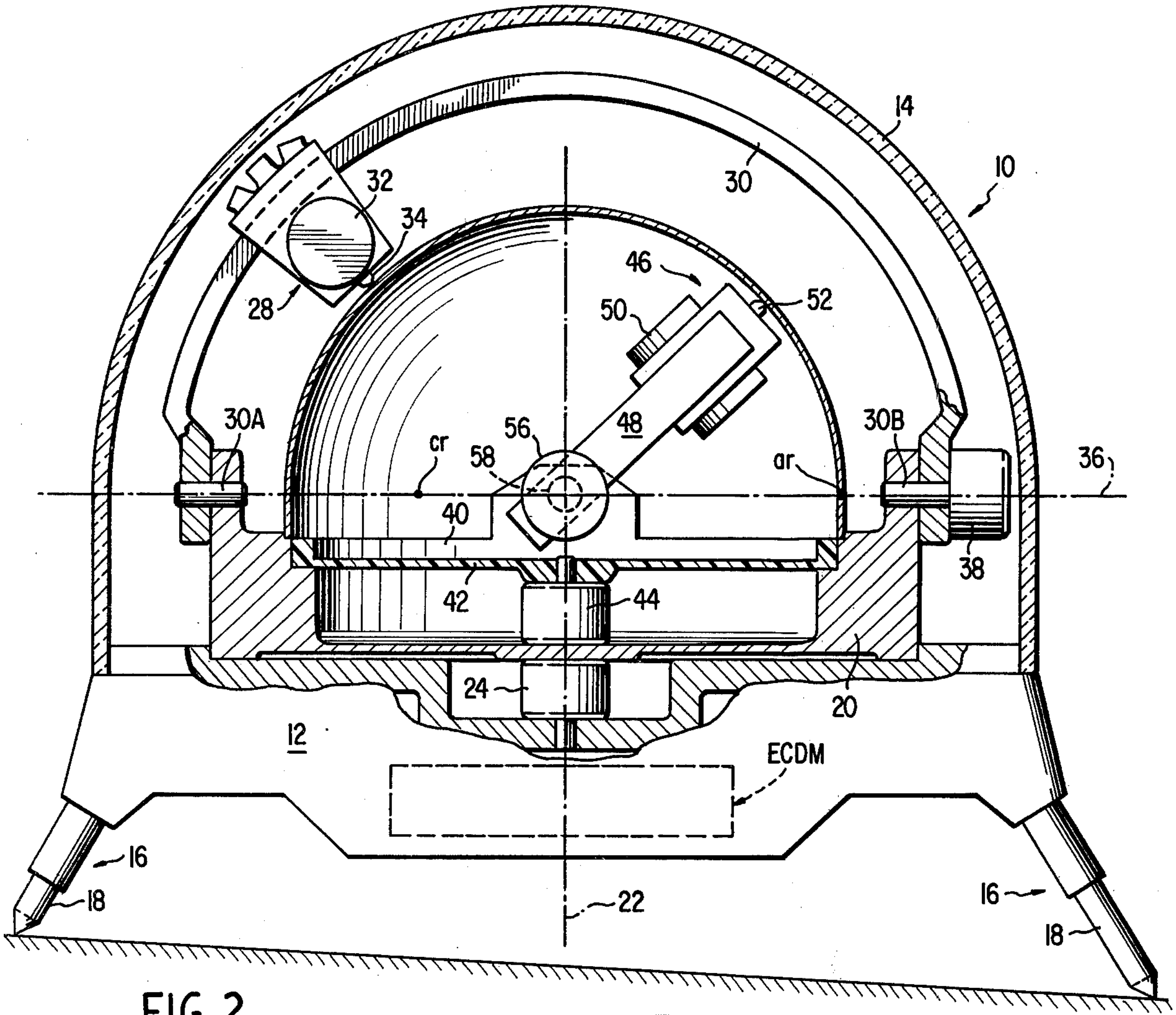
FIG. 2 is a fragmentary elevated view of the astronomical timepiece embodying the inventive concepts of the instant invention.
Figure 3:
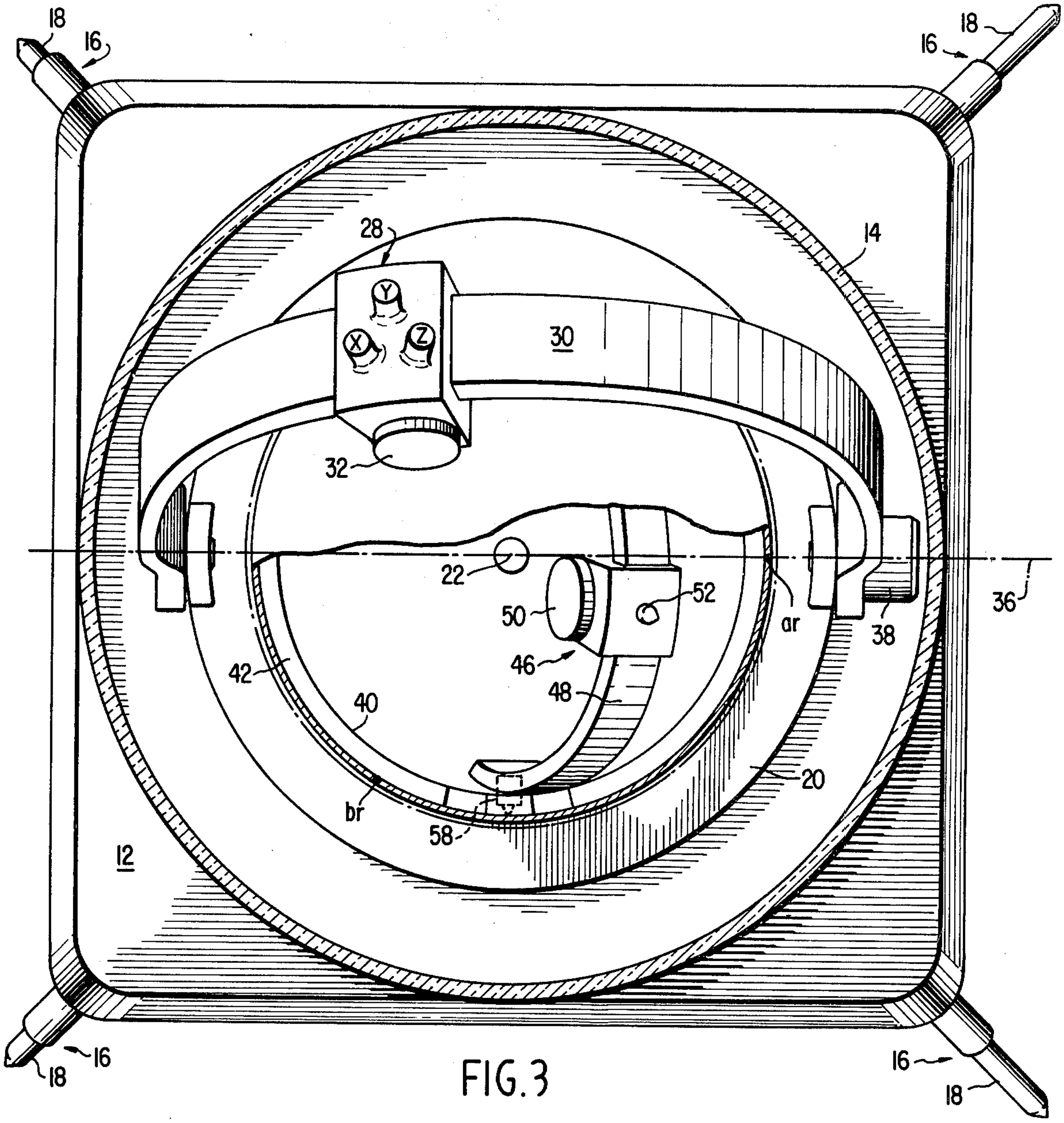
FIG. 3 is a fragmentary plan view of the astronomical timepiece.

Referring now to FIGS. 2 and 3, there is shown a fragmentary elevation view and a plan view, respectively, of an illustrative embodiment of the timepiece according to the present invention. An astronomical timepiece, shown generally at 10, is housed within a platform module 12 and a translucent dome 14. A plurality of levelling leg assemblies 16, having adjustable legs 18 are located at the lower extremities of the platform 12. The platform 12 serves to carry an electronic control and display means (ECDM) for the timepiece 10, and has mounted on it the various sensing and electromechanical means required for the determination of the key parameters from which the desired quantities, particularly local time, will be derived.

A horizontal base member 20 is seated on an upper surface of the platform 12 and is adapted to rotate about a vertical axis 22 when driven by a servo motor 24. The base 20 carries a dome-shaped resistive shell 26 around whose equatorial circumference is positioned three reference points designated ar, br and cr. The shell 26 is substantially hemispherical, the three points ar, br and cr are located in a horizontal plane and are spaced 120° apart. A sun ray sensor assembly 28 is carried by an arcuate sun arm 30 such that the sensor assembly 28 may traverse the substantially 180° length of the sun arm 30 when driven by a servo motor 32. Positioned on the upper surface of the sensor assembly 28, as best seen in FIG. 3, are a plurality of photosensitive cells designated 28x, 28y, and 28z. Positioned at the lower extremity of sensor assembly 28 is a wiping contact, designated pointer 34, which bears frictionally on the outer surface of shell 26. The sun arm 30 is configured to rotate about a horizontal axis 36, via pivot pins 30A and 30B, mounted on the base 20, when driven by a servo motor 38. Functionally, the combination of elements comprising the sun arm 30 and the sensor assembly 28 is rotated in azimuth along with base 20 and shell 26; and the pointer 34 (carried by the sensor assembly 28) may be directed to any angle within the solid angle of approximately $2\pi$ steradians by the combined motions of the sensor assembly 28 traversing along sun arm 30, and the rotation of the sun arm 30 about the axis 36.

For ease of reference, the designations and functional names of the servo motors used throughout the timepiece 10 are contained in Table I below.

TABLE 1

| Servo Motors | |
|---|---|
| Servo Motor | Functional Name |
| 32 | sun sensor traverse |
| 38 | sun arm rotate |
| 24 | base member rotate |
| 44 | ring member rotate |
| 50 | axis pointer traverse |
| 56 | axis arm rotate |

A horizontal ring member 40 is seated on an upper surface of the base member 20, via an intermediate low-frictional surface element 42, and is adapted to rotate about the vertical axis 22 when driven by a servo motor 44. A north axis assembly 46 is carried by an arcuate axis arm 48 such that the axis assembly 46 may traverse the substantially 180° length of the axis arm 48 when driven by a servo motor 50. Positioned on the upper extremity of axis assembly 46 is a wiping contact, designated pointer 52, which bears frictionally on the inner surface of shell 26. The axis arm 48 is configured to rotate about a horizontal axis (in the same plane as the horizontal axis 36) via a pair of pivot pins 58 anchored to elevated portions 54 of ring member 40, when driven by a servo motor 56. Also carried by the axis arm 48 is a wiping contact, designated pointer 52 which is located on the outer extremity of one of said pair of pivot pins opposite servo motor 56 and which bears frictionally on the inner surface of shell 26 in FIG. 3. Functionally, the combination of elements comprising the axis arm 48 and the axis assembly 46 are rotated in azimuth along with the ring 40; and the pointer 52 (carried by the axis assembly 46) may be directed to any angle within the solid angle of approximately $2\pi$ steradians by the combined motions of the axis assembly 46 traversing along axis arm 48, and the rotation of axis arm 48 about the horizontal axis defined by the pair of pivot pins previously described. The pointer 58 also rotates in azimuth along with ring 40 and bears on shell 26 in the horizontal plane containing the reference points ar, br and cr.

While the arms 30 and 48 and their respective supporting members 20 and 40 are similar in general configuration, it should be noted that the resistive shell 26 travels in azimuth fixedly with the sun arm 30, and that both the base element 20 and the ring element 40 are independently rotatable in azimuth.

The resistive shell 26 serves as a means for providing the precise locations of pointers 34, 52, and 58, thereby enabling the timepiece 10 to determine the respective vector direction of ob, oc and od as shown in FIG. 1. The vectors are defined as originating at the intersection of axes 22 and 36. Each vector is unambiguously determined by a resistive measurement technique between the appropriate pointers and each of the reference points ar, br and cr. Conceptually, the shell 26 may be considered as an X-Y plane of uniformly distributed surface area resistance which has been shaped into a hemisphere. Both the inner and outer surfaces are so utilized.

For purposes of clarity of exposition, only the major functional elements needed to implement the illustrative mechanism described above have been explicitly set forth. Of course, as is well known to those skilled in the art of precision electromechanical devices, additional elements such as bearings, wiring, hermetic and lubrication seals, slip rings, adjustment means, and so forth, are included in the operational mechanism.

Referring briefly to FIG. 1, and to Table 2 below, a brief overview of the significance of the vectors defined by the positions assumed by pointers 34, 52, and 58, can be seen. In actual operation, the vector ob represents the line of sight to the sun as defined by the position of pointer 34 on the shell 26; the vector oc represents true geographic north (and additionally is parallel to the planet's rotational axis) as defined by the position of pointer 52 on the shell 26; and the vector od represents true geographic east (90° clockwise from and in a plane orthogonal to oc) as defined by the position of pointer 58 on the shell 26.

TABLE 2

| Vector Pointers | | | |
|---|---|---|---|
| Pointer | Function | Initial Position | Vector |
| 34 | Sun Position | At zenith point of shell 26 | ob |
| 52 | True Geographic North | Point "ar" on shell 26 | oc |
| 58 | True Geographic East | 90° CW of point "ar" on shell 26 | od |

Figure 4:
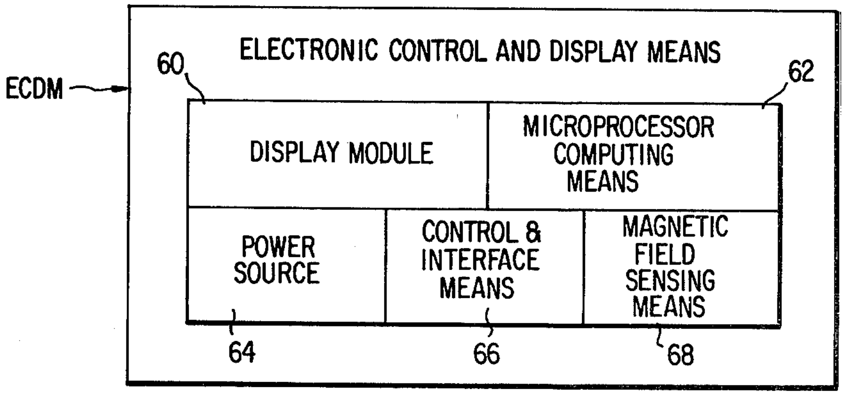
FIG. 4 is a simplified block diagram of an electronic control and display means for the astronomical timepiece.

Referring now to FIG. 4 there is shown, in simplified block diagram form, an electronic control and display means (ECDM) comprising five elements: a display module 60; a microprocessor computing means 62; a power source 64; a control and interface means 66; and a magnetic field sensing means 68. By way of an overview, the following description provides a brief summary of the functions performed by each of these. For the most part they represent fairly conventional and well known entities, and a detailed knowledge of each is not considered essential to an understanding of the inventive concept of the instant invention. The power source 64, illustratively a storage battery of nickle-cadmium, or silver-oxide cells, or the like, provides electrical power to operate the entire timepiece. The display module 60 provides a human-readable digital display capability for the various output data generated by the timepiece. This would display primarily solar time, but also includes sufficient display means for simultaneously reading out other data such as earth time, and latitude/-longitude. The microprocessor and computing means 62 is the primary computational entity for the timepiece, and is comprised of a conventional microprocessor supported by suitable ROMS (read-only memories), RAMS (random-access memories) and programming. The computing means 62 accepts the input data parameters in compatible form from the various electromechanical assemblies, performs the calculations indicated by the equations 1–8 described herein, and provides the desired output data to the display module 60. The control and interface means 66 serves to interface the various elements of the timepiece, especially those of the ECDM, and also performs the remainder of the electronic housekeeping tasks required in the timepiece. Illustratively, the interfacing means 66 accepts the outputs from computing means 62 and converts them to suitable power levels and in proper formats for operating the display module 60, the plurality of servo motors, the leg assemblies 16, and so forth. The magnetic field sensing means 68, illustratively a self-contained instrument comprising an array of flux gate sensors or the like, provides magnetic north data as required to initially position the base member 20, and to implement the feature described in connection with equation 8 herein-below.

Referring again to FIGS. 2 and 3, the techniques for acquiring the three input data parameters required by the timepiece 10 are described. By way of providing a set of initial conditions, reference is made to the data of Table 2. There it is seen that sun ray sensor assembly 28 is positioned such that the pointer 34 (sun position) is at the zenith point on shell 26; north axis assembly 46 is positioned such that pointer 52 (true geographic north) is at the reference point ar on shell 26; and that ring member 40 is positioned such that the pointer 58 (true geographic east) is at the point ar plus 90° clockwise as viewed from above (the zenith point) on shell 26.

Figure 5:
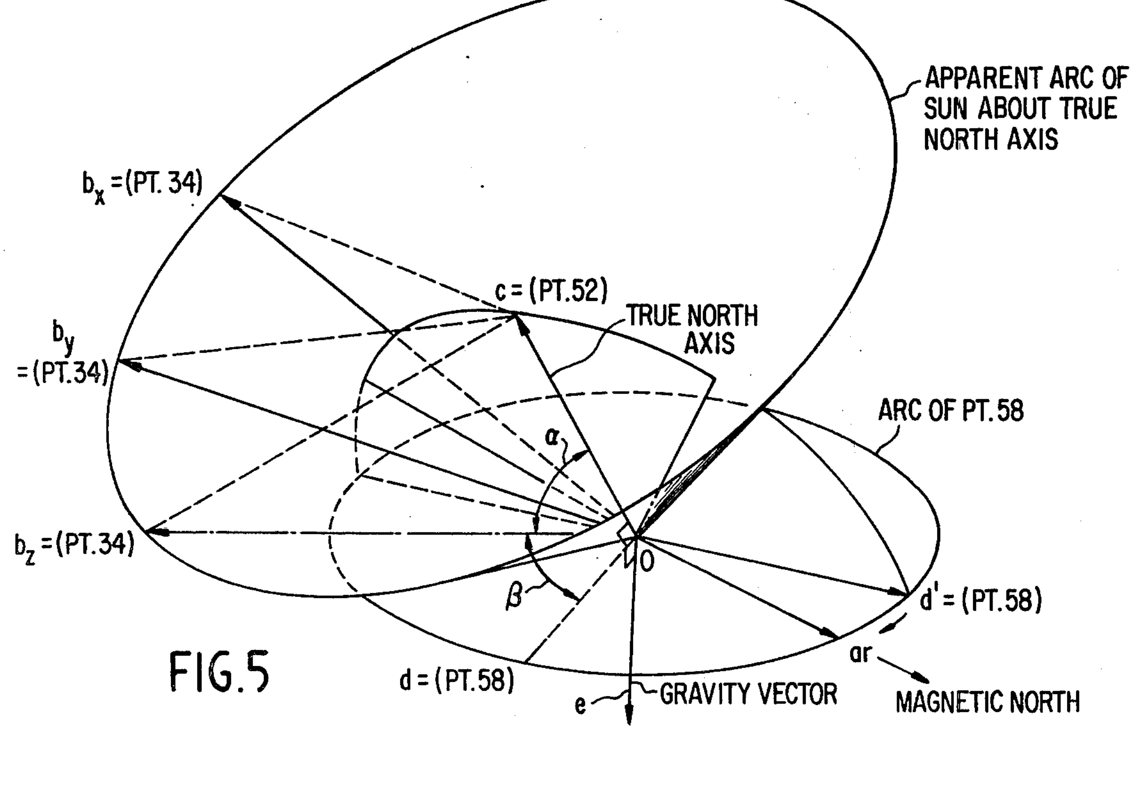
FIG. 5 is a perspective view of the spatial relationships between the various quantities sensed and derived.

The local vertical direction is first established. This may be done by a variety of means, all well known to those skilled in the art, including the use of well-known bubble sensors. For example, bubble level devices disposed at three of the four corners of platform module 12 may be used to provide control signals via electronic means to actuate the length adjusting drive means (all not shown) of adjustable legs 18 of leg assemblies 16. Alternately, pendulous mass sensors, or the like, mounted within the timepiece 10 may be used to provide the control signals. Of course, simpler manually-operated means may also be employed. Further details of a typical levelling mechanism, while not essential to an understanding of the instant invention, may be had by reference to U.S. Pat. No. 2,941,082 to Carbonara et al. On completion of this levelling step, the vertical axis 22 becomes the primary vertical reference and the horizontal axis 36 becomes the primary horizontal reference. Note that axis 22 of FIG. 2 is, in actual operation, identical to the vector oe as shown in FIGS. 1 and 5. Base member 20 and ring member 40 are also horizontal and are configured to sweep out precision horizontal planes upon rotation in azimuth.

Determination of the vector ob is made via sun ray sensor assembly 28 as follows. Automatically upon command from the ECDM, or upon initiation of a time determination sequence by whatever means, sensor assembly 28 is enabled to be positioned in response to the light-sensitive cells 28*x*–28*z* as shown in FIG. 3. From the initial position of sensor assembly 28, at least one of the triad-configured cells 28*z*–28*z* will be illuminated by the sun (assuming of course that the sun is above the local horizon) thereby providing an initial direction for a two-axis electronic servo system (not shown) which drives servo motors 32 and 38. Advantageously, the servo motors 32 and 38 as well as all other servo motors described herein are of the discrete stop type having a minimum step size consistent with the desired driven element granular accuracy, and minimizing the quiescent drive power requirements. Following motion in the appropriate initial direction, subsequent accurate positioning of sensor assembly 28 is achieved by the combined motions of its traversing via servo motor 32 in response to the relative outputs of cells 28*x* and 28*z*, and rotating of sun arm 30 via servo motor 38 in response to the relative outputs of cells 28*y* and 28*z*. Note that the most sensitive axes of cells 28*x*–28*x* are angularly displaced at some acute angle so that the incident sun rays must be made to bisect their included angles to equalize the outputs provided by any combination of the two cells. Two axis electromechanical servo positioning systems responsive to incident sun rays are well known to those skilled in the art. While the details of electromechanical servos are not essential to a clear exposition of the inventive concepts taught herein, additional details of such devices may be had by reference to U.S. Pat. No. 3,480,779 to Hand, Jr., and to U.S. Pat. No. 3,996,460 to Smith.

Upon stabilization of the sensor assembly 28 tracking, the vector ob is defined for use thereafter by the ECDM using the position of pointer 34 on shell 26 relative to the three reference points ar, br, and cr.

The determination of vector oc, the true north (plus axis) direction is accomplished in three steps as follows. Firstly, rotation of base member 20 is enabled via the ECDM, and a magnetic field sensing means 68 is used to provide control signals to drive the servo motor 24 such that reference point ar on shell 26 is pointed to the local (terrestrial or otherwise) magnetic north. Secondly, the north axis assembly 46 is driven to an intermediate position in response to two successive readings taken of the apparent arc of the sun. The ECDM records a first vector point reading $ob_x$, as shown in FIG. 5, and takes no further action until the sun has displaced itself by some predetermined angle. illustratively, this predetermined angle may be on the order of a few tens degrees — say 15°–30°, and of course is under the control of a program being executed in the ECDM. The ECDM then records a second vector point reading $ob_y$. On obtaining the readings of $ob_x$ and $ob_y$, servo motor 44 is energized to rotate ring member 40 from its initial position exactly 350° in the counterclockwise direction, and then is made to pause. The ECDM program monitors each discrete step of servo motor 44 and calculates the two positions of pointer 58 where angle $d'ob_x$ equals angle $d'ob_y$. Of the two positions, the positions closest to magnetic north point (ar) is chosen and servo motor 44 once again is energized so as to direct pointer 58 to that particular location. Servo motor 56 is then energized under control of the ECDM so as to rotate axis arm 48 counterclockwise from its initial position. Axis arm 48 continues to rotate about the axis containing pointer 58 until angle $cob_x$ equals angle $cob_y$. Having thus positioned the ring member 40 and the axis arm 48 as above, the third and final step for the determination of vector oc may be completed upon one further displacement measurement of the sun. This is done by taking a third vector point reading $ob_z$, after some predetermined sun angle displacement as before. The servo motor 50 is then energized so as to traverse north axis assembly 46 along the axis arm 48 in a first direction (or a second direction upon reaching a mechanical limit stop) so as to direct the pointer 52 until angle $cob_x$ equals angle $cob_z$. The ECDM now signals servo motors 56 and 50 to become free-wheeling while driving servo motor 44 until pointer 58 is both 90° from pointer 52, and is east of referene point ar. Pointer 52 applies sufficient pressure to shell 26 to enable the rotation of pointer 58 without moving pointer 52 when servo motors 56 and 50 are free-wheeling. Pointer 52 now points to true geographic north with its axis parallel to the planet's axis and thus the vectors oc and od are fully defined. (Pointer 52 would be pointing to true geographic south if the final rotated angle from initial rest position of axis arm 48 was greater than 90°.) At this point the acquisition of the required three input data parameters is complete.

Summarizing the subsequent operation of timepiece 10 is in order at this time. The sun ray sensor assembly 28 will continue tracking of the apparent arc of the sun about the true north axis for as long as the sun is above the visual horizon or until mechanical limits are met. The vectors oc, od, and oe remain, of course, constant as long as the timepiece 10 remains at the same location.

Hence there is provided a continuous determination of the angles $\alpha$ and $\beta$ which lie between the vectors ob and oc, and between the vectors ob and od respectively, and therefoore a continuous capability within the ECDM for calculating and displaying solar time according to equation 3 above.

ALTERNATE EMBODIMENTS AND USES

When the timepiece 10 according to the instant invention is functioning on a planet other than earth, the time required for the planet to revolve about its rotational axis will most likely take more or less than 24 earth hours to complete. To determine exactly how many earth hours it takes for a planet to revolve around its axis, the ECDM can be programmed to take a planet solar time reading $T_{o1}$ and store it. At the same time, the ECDM will take a time reading from an on-board earth clock, designated time $T_e$, and store it as time $T_{e1}$. After the planet's sun has completed a predetermined (assume 15°) arc in the planet's sky, the ECDM will take another pair of corresponding readings designated $T_{o2}$ and $T_{e2}$. The length of the planet's day and the planet's hour can be measured in earth hours by solving the following equations.

$$\text{Planet Day} = \frac{(24)\,(T_{o2} - T_{o1})}{(T_{e2} - T_{e1})} \qquad \text{Eqn. 6}$$

$$\text{Planet Hour} = \frac{T_{o2} - T_{01}}{T_{e2} - T_{e1}} \qquad \text{Eqn. 6A}$$

In addition to the calculation of solar time by means of the timepiece 10 according to the instant invention, both latitude and longitude locations of the timepiece may also be determined. Considering longitude — solution of the equations 6 and 6A will enable the establishment of a planet clock wherein one complete planet day may be divided into a number of arbitrary time increments. Selecting twenty-four increments, consonant with earth clock increments, the planet clock may be proportionately calibrated and for purposes of illustration will be designated as planet time $T_m$. $T_m$ will now become the reference meridian time for the entire planet. If the timepiece 10 were to be relocated to another longitude location upon the surface of the planet, a time clock $T_o$ would be initiated. The longitude location of the second site with respect to the original site can be determined through the solution of equations 5 and 5A.

Considering latitude — the latitude location of the instant invention at any location on a planet's surface can be determined by measuring the final rotated position of the axis arm 48 as shown in FIG. 2. The final rotated position of axis arm 48 is defined as $\Phi'$ where:

$$\text{Latitude location} = \begin{cases} 90° - \phi' & \text{for } \phi' < 90° \\ 270° - \phi' & \text{for } \phi' \geqq 90° \end{cases} \qquad \text{Eqn. 7}$$

Note that ($\phi'$-90°) equal $\phi$ as shown in FIG. 1 and as before the present invention recognizes latitude angle to be 0° at the north pole, 90° at the equator, and 180° at the south pole.

Additionally, utilizing the coordinates system available from the invention, a gyro compass heading could be initiated or could be corrected with reference to magnetic north. The reverse could also be true to establish the position of pointer 52 as shown in FIG. 2. If such cross-reference is available, the long time lapse required to establish true north at each new site location would not be necessary. If the timepiece of the instant invention were supported with the aid of a gyro compass, the timepiece could monitor time continuously during travel status. If the timepiece were mounted in an airplane on earth, and the unit was set for continuous monitoring of time, time readings would slow down and even run backwards as the westbound airplane would approach and exceed the surface rotation speed of the earth. Time readings would go ever faster in an ever faster eastbound plane. Time reading increments would remain constant and normal in a north or south bound plane following a longitudinal line course.

Magnetic north deviation is monitored within the timepiece 10 by measuring the angle displacement of pointer 58 and reference point ar on shell 26, as shown in FIG. 3. The angle displacement of pointer 58 in reference to point ar is angle ∠doar as shown in FIG. 5. Magnetic north deviation may therefore as calculated, and stored if required in the ECDM, utilizing the following calculation:

$$\text{Magnetic deviation} = 90° - \angle\text{doar} \qquad \text{Eqn. 8}$$

Note that a positive angle means magnetic north lies east of true north and a negative resultant angle means magnetic north lies west or true north.

Finally, it is noted that the electromechanical implementation set forth in the illustrative embodiment should not be considered as a limitation on either the methods taught herein, or on other possible analogous mechanisms. Basically, the illustrative embodiment discloses the use of an independent pair of servo driven assemblies each of which comprises a curved arm of 180° length which is rotatable about a horizontal axis, and a traverse assembly carried thereby. Together, these two subassemblies merely implement an easily controllable means for positioning a pointer within a 2 $\pi$ steradian angle, as "read out" on a hemispherical potentiometer in the form of a resistive shell. Obviously, equivalent non-servo means may be used for these purposes and may be considered entirely analogous. Considering, for example, that pointer 52 (north axis; vector oc) has for its primary function the providing of solid angle data to the ECDM, a fully equivalent means for doing this are well known and available. Illustratively, the ECDM control signals which drive servo motor 56 to rotate axis arm 48 may be converted to digital form and stored. Similarly, the control signals which drive servo motor 50 to move the axis assembly 46 may be stored in digital form. Straightforward digital manipulation would then yield the vector oc in digital form. Likewise the angles $\alpha$ and $\beta$ could be digitally derived without servo driven, physically articulated mechanisms.

Although the present invention has been described in terms of selected illustrative embodiments, and alternate embodiments, the invention shohuld not be deemed limited thereto since other embodiments and modifications will readily occur to one skilled in the art. It is therefore to be understood that the appended claims are intended to cover all of such modifications as fall within the true spirit and scope of the invention.

Appendix I — Derivation of Equation 2

A proof that angle $\theta$ may be derived from the angles $\alpha$ and is set forth below, with particular reference to FIG. 1A.

Let $od = oc = 1$ $$\therefore cd = \sqrt{(od)^2 + (oc)^2} = \sqrt{1^2 + 1^2} = \sqrt{2}$$

Draw $ca' \perp bo$ $$\therefore \angle cob' = 180 - \alpha$$

$$\therefore \angle bca' = \alpha - 90°$$

$$\therefore ob' = \frac{oc \sin(\alpha - 90)}{\sin 90°} = \frac{1 \sin(\alpha - 90)}{1} = \sin(\alpha - 90°)$$

$$\therefore cb' = \frac{oc \sin(180 - \alpha)}{\sin 90°} = \sin(180 - \alpha) = \sin \alpha$$

$$oa' = \frac{oc \sin(\alpha - 90°)}{\sin(180 - \alpha)} = \frac{\sin(\alpha - 90°)}{\sin \alpha}$$

$$a'c = \frac{oc \sin 90°}{\sin(180 - \alpha)} = \frac{1}{\sin(180 - \alpha)} = \frac{1}{\sin \alpha}$$

$$b'd = \sqrt{(ob')^2 + (od)^2 - 2(ob')(od)\cos(180 - \beta)}$$

$$= \sqrt{\sin^2(\alpha - 90°) + 1 - 2\sin(\alpha - 90)(-\cos\beta)}$$

$$= \sqrt{\sin^2(\alpha - 90°) + 1 + 2\sin(\alpha - 90)\cos\beta}$$

$$\cos \angle a'cd = \frac{(cd)^2 + (cb')^2 - (b'd)^2}{2(cd)(cb')} = \frac{2 + \sin^2\alpha - \sin^2(\alpha - 90) - 1 - 2\sin(\alpha - 90)\cos\beta}{2\sqrt{2}\sin\alpha}$$

$$= \frac{1 + \sin^2\alpha - \sin^2(\alpha - 90) - 2\sin(\alpha - 90)\cos\beta}{2\sqrt{2}\sin\alpha}$$

$$(a'd)^2 = (a'c)^2 + (cd)^2 - 2(a'c)(cd)\cos \angle a'cd$$

$$= \frac{1}{\sin^2\alpha} + 2 - 2\frac{1}{\sin\alpha}\sqrt{2}\left[\frac{1 + \sin^2\alpha - \sin^2(\alpha - 90) - 2\sin(\alpha - 90)\cos\beta}{2\sqrt{2}\sin\alpha}\right]$$

$$= \frac{1 + 2\sin^2\alpha - 1 - \sin^2\alpha + \sin^2(\alpha - 90) + 2\sin(\alpha - 90)\cos\beta}{\sin^2\alpha}$$

$$= \frac{\sin^2\alpha + \sin^2(\alpha - 90) + 2\sin(\alpha - 90)\cos\beta}{\sin^2\alpha}$$

$$\cos(180 - \theta) = \frac{(oa')^2 + (od)^2 - (a'd)^2}{2(oa')(od)}$$

$$= \frac{\frac{\sin^2(\alpha - 90)}{\sin^2\alpha} + \frac{\sin^2\alpha}{\sin^2\alpha} - \left[\frac{\sin^2\alpha + \sin^2(\alpha - 90) + 2\sin(\alpha - 90)\cos\beta}{\sin^2}\right]}{2\left[\frac{\sin(\alpha - 90)}{\sin\alpha}\right]}$$

$$= \frac{-\cos\beta}{\sin\alpha}$$

however $\cos\theta = -\cos(180 - \theta) = \frac{\cos\beta}{\sin\alpha}$ $$\therefore \theta = \cos^{-1}\left[\frac{\cos\beta}{\sin\alpha}\right]$$

What is claimed is:

1. A method for determining solar time at any location on a planet similar to earth having a radiating sun and whose period of rotation about its geographic axis is known comprising:

(a) establishing first, second and third vector directions at said location wherein at least one of said vectors is a line of sight to said sun;

(b) determining first and second angles via electronic means responsive to electronic signals representative of said first, second and third vector directions, said first angle lying between said first and second vectors and said second angle lying between said first and third vectors;

(c) determining solar time at said location by use of the equation $$\text{solar time} = \frac{x}{4} + \frac{x \cos^{-1}\left(\frac{\cos \beta}{\sin \alpha}\right)}{360}$$

where x denotes said period in predetermined time units; $\alpha$ denotes said first angle and $\beta$ denotes said second angle; and (d) converting said determined solar time via electronic means to a human readable display.

2. The method as recited in claim 1 wherein said first vector is directed along a line of sight to said sun, said second vector is parallel to the rotation axis and is directed to a predetermined pole of said planet and said third vector lies in a first plane orthogonal to said second vector and lies in a second plane tangent to the surface of said planet at said location and also is rotated 90° C. in a predetermined direction from said second vector.

3. The method as recited in claim 2 wherein said step of determining solar time is accomplished via electronic means responsive to electronic signals representative of said first and second angles.

4. The method as recited in claim 3 wherein said electronic means for determination of solar time comprises digital computing means.

5. The method as recited in claim 2 wherin said planet is earth having a period of rotation of substantially 24 hours and said means for determination of solar time uses the equation $$\text{solar time} = \frac{1}{15}\left[90^\circ + \cos^{-1}\left(\frac{\cos \beta}{\sin \alpha}\right)\right]$$

6. The method as recited in claim 2 wherein the step of establishing said first vector direction is done for a substantially continuous predetermined interval thereby permitting the determination of solar time continuously during said interval.

7. At any location on a rotating planet having a radiating sun, a method for determining solar time, comprising:

(a) establishing first, second and third vector directions at said location wherein at least one of said vectors is a line of sight to said sun;

(b) determining first and second angles via electronic means responsive to electronic signals representative of said first, second and third vector directions, said first angle lying between said first and second vectors and said second angle lying between said first and third vectors;

(c) establishing the planet's period of revolution by means of a first and second pair of time determinations using successive values of at least said first and second angles;

(d) determining solar time at said location by solution of the time equation $$\text{solar time} = \frac{x}{4} + \frac{x \cos^{-1}\left(\frac{\cos \beta}{\sin \alpha}\right)}{}$$

where x denotes said period of revolution in earth hours, $\alpha$ denotes said first angle and $\beta$ denotes said second angle; and (e) converting said determined solar time via electronic means to a human readable display.

8. The method as recited in claim 7 wherein said first vector is directed along a line of sight to said sun, said second vector is parallel to the rotation axis and is directed to a predetermined pole of said planet and said third vector lies in a first plane orthogonal to said second vector and lies in a second plane tangent to the surface of said planet at said location and also is rotated 90° in a predetermined direction from said second vector.

9. The method as recited in claim 8 wherein said step of establishing said period of revolution further comprises the steps of establishing a first and second pair of time determinations wherein:

(a) said first pair comprises a first planet time $T_{o1}$ derived from the time equation using an arbitrary value for the required planet's period of revolution in earth hours, and a first earth time $T_{e1}$ taken simultaneously with $T_{o1}$ corresponding to a predetermined location on earth;

(b) said second pair comprises a second planet time $T_{o2}$ derived as previously, and a second earth time $T_{e2}$ taken simultaneously with $T_{o2}$ corresponding to said earth location;

(c) determining the planet's period of revolution in earth hours by use of the equation $$x = 24\frac{(T_{o2} - T_{o1})}{(T_{e2} - T_{e1})}$$

where x denotes said period.

10. The method as recited in claim 8 wherein said step of determining said period of revolution is accomplished via electronic means responsive to electronic signals representative of at least said first and second angles.

11. The method as recited in claim 10 wherein said electronic means comprises a digital computing means.

12. The method as recited in claim 9 wherein said step of determining solar time is accomplished via electronic means responsive to electronic signals representative of said determined first and second angles.

13. The method as recited in claim 12 wherein said electronic means comprises a digital computing means.

14. The method as recited in claim 7 wherein said steps of establishing first, second and third vector directions is accomplished via electronic means having output signals representative of said vector directions.

15. The method as recited in claim 14 wherein said means for determining first and second angles comprises electronic means responsive to said output signals.

16. The method as recited in claim 15 wherein said means for determining solar time comprises electronic digital computer means.

17. An astronomical timepiece for automatically determining and displaying solar time for any location on any planet having a radiating sun, said timepiece comprising:

(a) means for detecting solar radiation and for providing directional information thereof in the form of corresponding electronic signals to a central means;

(b) means for detecting a gravitational field direction of said planet and for providing said directional information in the form of corresponding electronic signals to said central means;

(c) means for establishing the direction of the axis of rotation of said planet, and for providing said directional information in the form of corresponding electronic signals to said central means; and (d) wherein said central means is comprised of electronic control, computing, interfacing and display means adapted to accept at least said three electronic directional signals and for converting them into a human readable solar time display.

18. The astronomical timepiece of claim 17 wherein said solar radiation directional information and said gravitational field directional information and said axis of rotation directional information are provided to said central means via said interfacing means.

19. The astronomical timepiece of claim 18 wherein said means for detecting solar radiation comprises at least three light sensitive cells and said directional information providing means comprises electronic means having input/output interfaces with said central means.

20. The astronomical timepiece of claim 19 wherein said solar directional information providing means has moveable members operable in part in response to said light sensitive cells.

21. The astronomical timepiece of claim 19 wherein said means for establishing the axis of rotation further comprises means for responding to at least two successive values of said solar direction as referenced to at least said gravitational field direction.

22. The astronomical timepiece of claim 21 wherein said axis establishing means has moveable members operable in part in response to said solar directional information and said gravitational field directional information.

23. The astronomical timepiece of claim 18 wherein said solar, gravitational and axis electronic signals are derived substantially from three analog positions on a hemispherical shell having a uniform distribution of surface resistance thereon.

24. The astronomical timepiece of claim 19 wherein said central means comprises a microprocessor computing means.

25. The astronomical timepiece of claim 24 wherein said central means comprises a human-readable digital display means for displaying at least solar time.

* * * * *

UNITED STATES PATENT AND TRADEMARK OFFICE

CERTIFICATE OF CORRECTION

PATENT NO. : 4,136,397

DATED : January 23, 1979

INVENTOR(S) : Darrel J. Pierce

It is certified that error appears in the above-identified patent and that said Letters Patent are hereby corrected as shown below:

In the Abstract, Line 4, "prior" should be ---priori---

Column 5, line 25, "52" should be ---58---

Column 7, line 43,"28z-28z" should be ---28x-28z---

Column 7, line 59,"28x-28x" should be ---28x-28z---

Column 8, line 26, "350°" should be ---360°---

Column 8, line 37, "58" should be ---52---

Column 9, line 4, "therefoore" should be ---therefore---

Column 10,line 18, "as" should be ---be---

Column 10,line 26, "or" should be ---of---

Column 10,line 57, "shohuld" should be ---should---

Column 10,line 67, after "and" please insert ---$\beta$---

UNITED STATES PATENT AND TRADEMARK OFFICE
CERTIFICATE OF CORRECTION

PATENT NO. : 4,136,397

DATED : January 23, 1979

INVENTOR(S) : Darrel J. Pierce

It is certified that error appears in the above-identified patent and that said Letters Patent are hereby corrected as shown below:

In the equation of Column 11, at approximately line 45, after "$\sin^2$" please insert --- $\alpha$ --- so the line of the equation reads as follows:

$$= \frac{\sin^2(\alpha - 90)}{\sin^2\alpha} + \frac{\sin^2\alpha}{\sin^2\alpha} - \left[\frac{\sin^2\alpha + \sin^2(\alpha-90) + 2\sin(\alpha - 90)\cos\beta}{\sin^2\alpha}\right]$$

Column 13, line 61, the equation of Claim 7, paragraph (d) should read as follows:

$$\text{solar time} = \frac{x}{4} + \frac{x\cos^{-1}\left(\frac{\cos\beta}{\sin\alpha}\right)}{360}$$

Signed and Sealed this

*Third* Day of *July 1979*

[SEAL]

*Attest:*

LUTRELLE F. PARKER

*Attesting Officer* *Acting Commissioner of Patents and Trademarks*